Figure 1:
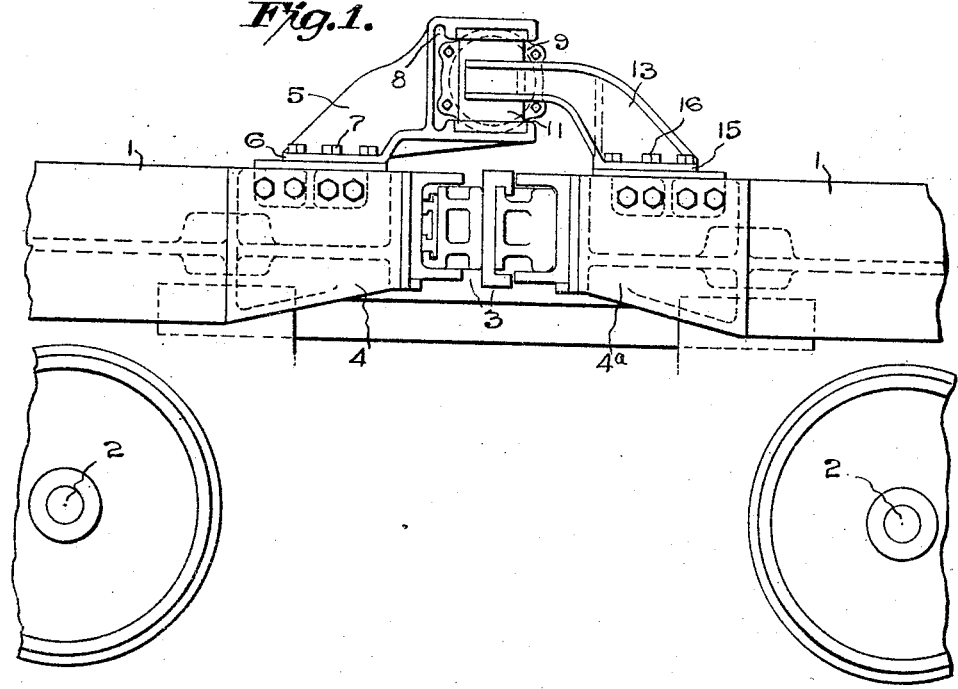

May 12, 1925.  
J. G. RITTER  
CENTERING DEVICE  
Filed June 6, 1924

1,537,696

2 Sheets-Sheet 1

WITNESSES:
R. S. Harrison
W. B. Jaspert

INVENTOR
John Gilbert Ritter
BY
Wesley L. Barr
ATTORNEY

May 12, 1925.  1,537,696
J. G. RITTER
CENTERING DEVICE
Filed June 6, 1924  2 Sheets-Sheet 2
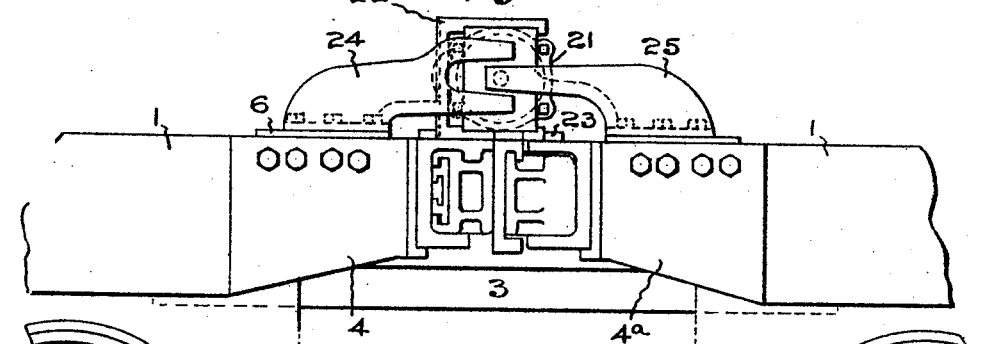
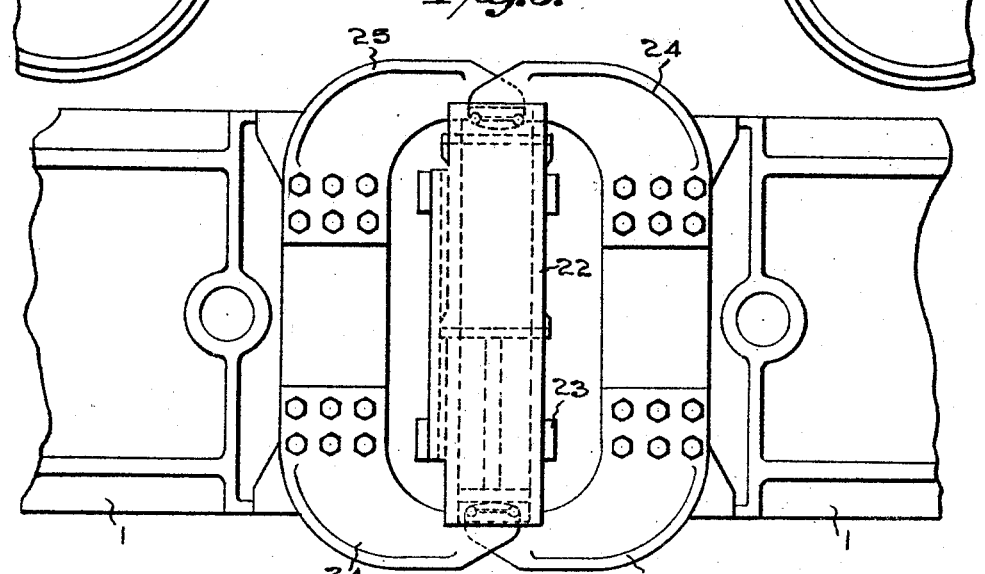
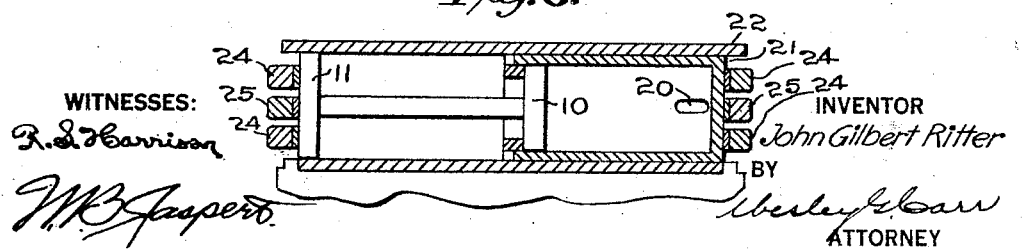
WITNESSES:  INVENTOR
R. S. Harrison  John Gilbert Ritter
  BY
  Wesley G. Carr
  ATTORNEY Patented May 12, 1925.

1,537,696

UNITED STATES PATENT OFFICE.

JOHN GILBERT RITTER, OF WILKINSBURG, PENNSYLVANIA, ASSIGNOR TO WESTINGHOUSE ELECTRIC & MANUFACTURING COMPANY, A CORPORATION OF PENNSYLVANIA.

CENTERING DEVICE.

Application filed June 6, 1924. Serial No. 718,226.

*To all whom it may concern:*

Be it known that I, JOHN GILBERT RITTER, a citizen of the United States, and a resident of Wilkinsburg, in the county of Allegheny and State of Pennsylvania, have invented a new and useful Improvement in Centering Devices, of which the following is a specification.

My invention relates to centering devices, more particularly centering devices for steering the supporting or driving trucks of railway vehicles, relative to the cab or main body portion when the vehicle runs from a tangent on a curve or vice versa.

It is among the objects of my invention to provide a centering device for railway vehicle trucks which shall be simple in mechanical construction and in operation, and which shall operate efficiently in steering the trucks relative to the vehicle body and the rails.

It is a further object of my invention to provide a centering device of the above-indicated character which shall be applicable to any type of articulated truck construction or articulated train units where relative steering or centering is a desirable characteristic of operation.

It is still a further object of my invention to provide a centering device which shall be readily applied to any type of vehicle truck without requiring special construction, thus making the present invention accessible for application to standard vehicles that were originally designed for other modes of centering.

The necessity for providing a steering or centering characteristic of the articulated truck members of railway vehicles is universally recognized and is almost essential for some road beds on which sharp curves and short tangents are frequently encountered. Centering is also essential where the vehicle cab or body is exceptionally long and for this reason employs a plurality of driving trucks that are articulated, each truck being of relatively short wheel base to prevent binding with the rails, which produces excessive wear of the wheel flanges, and to prevent undesirable stress of the vehicle frame.

My present invention is directed to a centering device which obviates these difficulties by providing a positive centering characteristic of the several trucks for any direction of curvature of the rails. The centering device preferably comprises a movable air cylinder and piston, which are embodied in a light-weight device that may be applied to the vehicle trucks or to the end sills of the vehicle bodies.

Figure 2:
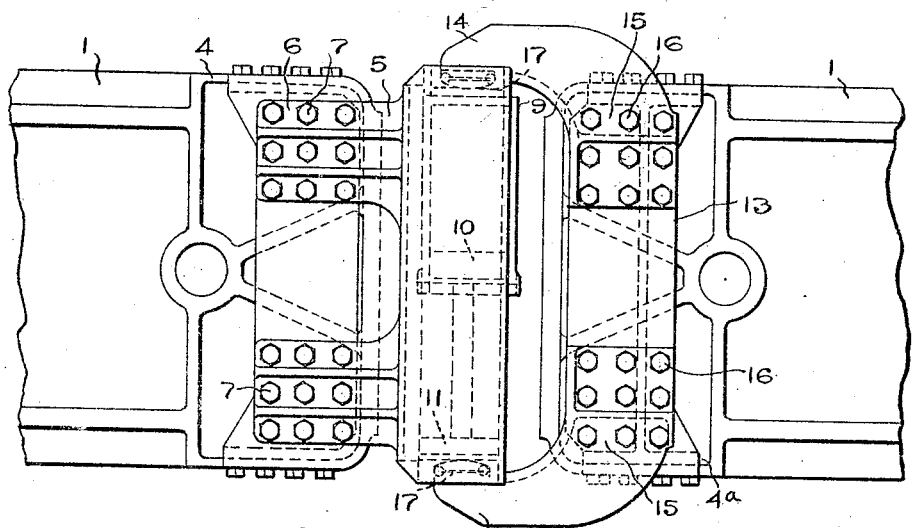
Figure 3:
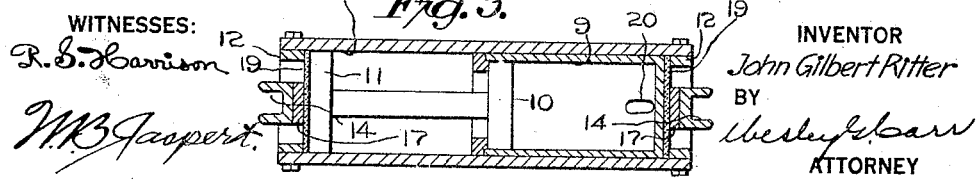

In the accompanying drawings constituting a part hereof and in which like reference characters designate like parts:

Figure 1 is a view in side elevation of fragmentary portions of a pair of articulated trucks having a centering device attached thereto embodying the principles of my invention, Fig. 2 is a top plan view thereof, Fig. 3 is an enlarged view, partially in section and partially in elevation, of the air cylinder and piston members utilized therein, Fig. 4 is a view in side elevation of a modification of the centering device shown in Fig. 1, Fig. 5 is a top plan view thereof, and Fig. 6 is an enlarged transverse sectional view of the air cylinders, piston and cooperating truck portions of the centering device shown in Figs. 4 and 5.

Referring to Figs. 1 and 2, the reference character 1 designates portions of truck frames that are journalled upon wheel axles 2 in the usual manner. The truck frames 1 may be connected by drawbars 3 or by any articulated joint that is secured to the respective end sills 4 and 4a, the particular type of joint being no part of the present invention. A mounting bracket 5 has a base 6 secured to the end sill 4 of one of the trucks by a plurality of bolts 7. The extended portion of the bracket 5 (see also Fig. 3) is of substantially box-shape and is provided with an opening 8, which is adapted to receive a movable cylinder 9 and a piston member 10 that is disposed in the cylinder 9. The piston is provided with an expanded cylindrical portion or piston member 11 which is slidably mounted in the opening 8, and a pair of end brackets 12 are secured at the ends of the main bracket 5 to retain the cylinder and piston member within proper bounds.

A yoke member 13 having extending arms 14 is secured at its base 15 to the sill 4a of the co-operating truck member by a plurality of bolts 16. The ends of the yoke arms 14 are provided with wearing pads 17 which engage a pair of wearing plates 19 that are disposed on the outer ends of the cylinder 9 and piston member 11. The wearing plates 19 may be hardened steel plates, or special alloys such as manganese, to reduce erosion of the engaging parts.

The cylinder 9 is provided with an opening 20 leading to a source of fluid pressure, such as compressed air. The engaging surfaces of the cylinder, pistons and the bracket 5 are lubricated in any suitable manner.

The operation of this device is briefly as follows: When the truck members are entering a curve, the leading truck will follow the curvature of the rails, which swings the end sill 4 out of alinement with the follower truck, against the yielding resistance of the pressure in the air cylinder 9 that is produced by the contact of the one or the other yoke arm 14. This action causes a movement of the cylinder 9 or piston 10, in accordance with the direction of the curvature of the rails.

The restraining effect of the fluid pressure thus exerts a force on the yoke member 13 that is adapted to produce a steering effect or centering action on the follower truck, which steers the truck member relative to the rail and relieves the strain or pressure on the wheel flanges and frame structures.

It will be noted that the air cylinder 9 and piston 10 are movable relative to each other and to the mounting bracket 5, so that when the leading truck rounds a curve in one direction, the piston 10 is pushed into the cylinder against the air pressure and when the curve is in the other direction, the cylinder is moved relative to the piston. It is obvious that other forms of pressure may be supplied, such as by utilizing coil springs between the piston and cylinder, or any other suitable pressure means may be utilized without changing the relative movements of the piston and cylinder.

In the centering device shown in Figs. 4, 5 and 6, a cylinder 21 is contained in a box housing 22, which is mounted on the end sills 4 and 4a of the trucks. The housing 22 is restrained from movement by liners 23 and is secured in no other manner, so that it may be removed by lifting it vertically.

A forked arm 24 is secured to one side of each of the trucks 1 and a single-pronged arm 25 is secured to the other side of each truck. The prongs of the arms 24 and 25 are adapted to interlace and engage the piston member 11 and the end of the cylinder 21, as shown in Fig. 6.

In this type of construction each truck or cab will be provided with a forked and single pronged arm thus making the centering device interchangeable for any truck or cab or any end thereof. The operation of the device is similar to that described above.

It is evident from the foregoing description of my invention that a centering device for articulated trucks or vehicles made in accordance therewith provides a simple and efficient means for steering or centering vehicles or trucks relative to the rail contour and that such a centering device is of simple, compact and durable mechanical construction, of relatively light weight, and readily applicable to any standard form of truck or vehicle design.

Although I have described specific embodiments of my invention, it will be obvious to those skilled in the art that various changes may be made in the details of construction and the manner of mounting or applying my invention without departing from the principles herein set forth.

I claim as my invention:—

1. The combination with a plurality of articulated trucks, of a centering device, said device comprising a cylindrical member mounted on one of said trucks and having a movable cylinder and co-operating piston disposed therein, and a yoke mounted on the co-operating truck having arms adapted to engage said cylinder and piston.

2. The combination with a plurality of articulated trucks, of a centering device, said device comprising a mounting bracket secured on the end sill of one of said trucks and having a transverse opening therein, a cylinder movably mounted in said opening, a piston operatively disposed in said movable cylinder, and a yoke secured to said other truck to co-operatively engage said piston and said cylinder.

3. The combination with a plurality of articulated trucks, of a fluid-pressure centering device, said device comprising a guide member mounted on one of said trucks and having a movable cylinder and co-operating piston disposed therein, and a yoke mounted on the co-operating truck having arms adapted to engage said cylinder and piston.

4. The combination with an articulated railway vehicle, of a centering device therefor and means for effecting steering of the articulated members relative to the curvature of the rail, said centering device comprising a plurality of pronged arms secured to the ends of the articulated members and a fluid-pressure apparatus adapted to engage the prongs of said arms.

5. The combination with an articulated railway vehicle, of a centering device therefor, and means for effecting steering of the articulated members relative to the curvature of the rail, said centering device comprising a plurality of pronged arms secured to the ends of the articulated members and a fluid-pressure device adapted to be disposed between the prongs of said arms.

6. The combination with an articulated railway vehicle, of a centering device therefor and means for effecting steering of the articulated members relative to the curvature of the rail, said centering device comprising a plurality of pronged arms secured to the ends of the articulated members and a fluid-pressure device comprising a guide and a cylinder and piston structure mounted between liners on said articulated members.

7. The combination with an articulated railway vehicle, of a centering device therefor and means for effecting steering of the articulated members relative to the curvature of the rail, said centering device comprising a plurality of pronged arms secured to the ends of the articulated members and a fluid-pressure apparatus comprising a guide and a cylinder and piston structure removably mounted on said articulated members.

8. The combination with an articulated railway vehicle, of a centering device therefor and means for effecting steering of the articulated members relative to the curvature of the rail, said centering device comprising a guide, a cylinder, a piston and a plurality of pronged arms respectively arranged to be interchangeable.

In testimony whereof, I have hereunto subscribed my name this 2nd day of June 1924.

JOHN GILBERT RITTER.